United States Patent [19]

Imabuchi et al.

[11] 4,056,271
[45] Nov. 1, 1977

[54] VEHICLE OCCUPANT RESTRAINING BELT WITH DEVICE TO PROVIDE AN ARRANGEMENT IN WHICH SHOULDER BELT IS PREVENTED FROM TOUCHING SEATED OCCUPANT'S NECK

[75] Inventors: Yoshihisa Imabuchi; Kenshi Kurami; Yoshinori Akiyama; Katsunobu Sobajima, all of Yokohama, Japan

[73] Assignee: Nissan Motor Company, Limited, Yokohama, Japan

[21] Appl. No.: 734,886

[22] Filed: Oct. 22, 1976

Related U.S. Application Data

[62] Division of Ser. No. 613,419, Sept. 15, 1975.

[51] Int. Cl.² ............................................. B60R 21/02
[52] U.S. Cl. .................................................... 280/745
[58] Field of Search ................... 280/745, 747, 744; 297/389

[56] References Cited

U.S. PATENT DOCUMENTS

| 3,236,540 | 2/1966 | Berton | 280/747 |
| 3,567,247 | 3/1971 | Sobkow | 280/747 |
| 3,770,078 | 11/1973 | Keppel | 280/745 |
| 3,856,327 | 12/1974 | Otani | 280/745 |
| 3,865,397 | 2/1974 | Pilhall | 280/745 |

*Primary Examiner*—Robert R. Song
*Attorney, Agent, or Firm*—Lowe, King, Price & Markva

[57] ABSTRACT

A channel shaped member is mounted on a roof within an occupant compartment. The channel shaped member slidably receives an intermediate portion of a shoulder belt that has one end received within a retractor mounted on the roof within the occupant compartment adjacent an outboard upper rear portion of a vehicle seat and that has its other end secured to an intermediate portion of a lap belt. The channel shaped member thus provides an arrangement in which the shoulder belt extends diagonally across the chest portion of the seated occupant without touching the occupant's neck.

1 Claim, 9 Drawing Figures

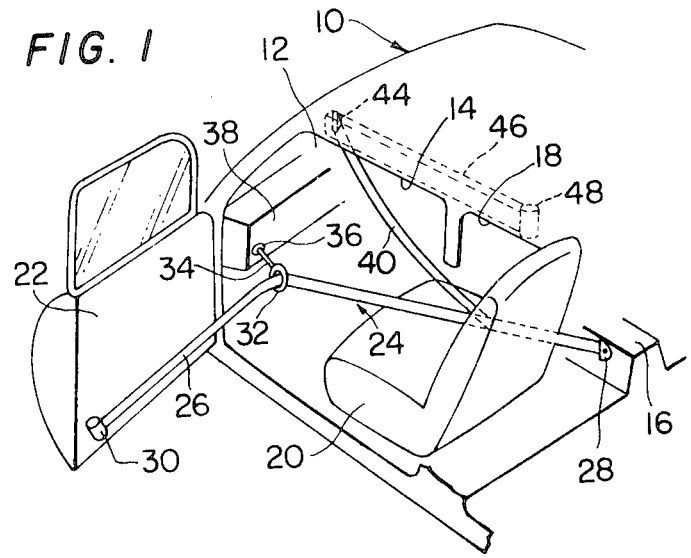
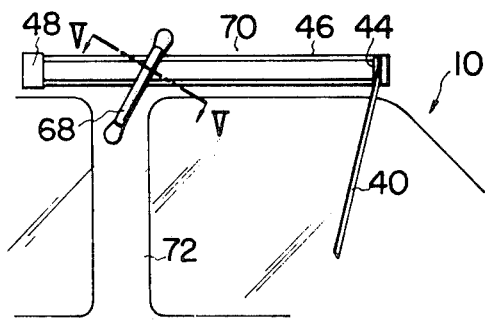
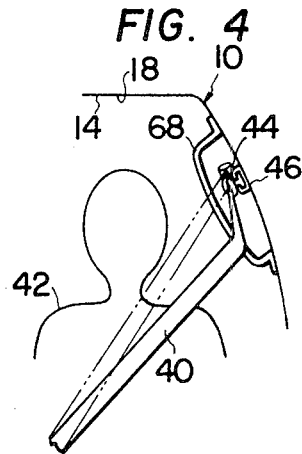
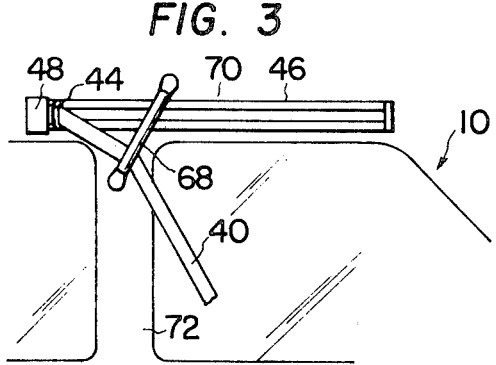

VEHICLE OCCUPANT RESTRAINING BELT WITH DEVICE TO PROVIDE AN ARRANGEMENT IN WHICH SHOULDER BELT IS PREVENTED FROM TOUCHING SEATED OCCUPANT'S NECK

This is a division of application Ser. No. 613,419, filed Sept. 15, 1975.

The present invention relates to a vehicle occupant restraining belt arrangement, and more particularly to a device to provide an arrangement in which a shoulder belt of the belt arrangement is prevented from touching the neck of a seated occupant.

The present invention is applicable to a vehicle occupant restraining belt arrangement of the type having a shoulder belt whose one end is received within a roof mounted inertia retractor and whose other end is connected to the middle of a lap belt and extends diagonally across the chest of a seated occupant when the belt is in an occupant restraining position and the invention provides an arrangement in which the shoulder belt is prevented from touching the neck of the seated occupant.

In a preferred embodiment of the present invention a channel shaped member is mounted on a roof within an occupant compartment and slidably receives an intermediate portion of a shoulder belt that has one end received within a retractor mounted on the roof within the occupant compartment adjacent an outboard upper rear portion of a vehicle seat so as to provide an arrangement in which the shoulder belt extends diagonally across the chest of a seated occupant without touching the neck of the seated occupant when the shoulder belt is in an occupant restraining position.

It is accordingly an object of the present invention to provide an arrangement in which a shoulder belt of an occupant belt arrangement is prevented from touching the neck of a seated occupant.

This and other objects of the present invention will be readily apparent from the following detailed description and accompanying drawings in which:

FIG. 1 is a partially cut away perspective view of a portion of a vehicle body whose door is shown in open position and which includes a passive occupant restraining belt arrangement shown in easy-enter position;

FIG. 2 is a view of the interior of the vehicle with the shoulder belt in the easy-enter position showing one embodiment of an arrangement according to the present invention in which the shoulder belt is prevented from touching the neck of a seated occupant;

FIG. 3 is a similar view to FIG. 2 showing the shoulder belt in an occupant restraining position;

FIG. 4 is a front view of the vehicle interior as seen from the right hand side of FIG. 3;

FIG. 5 is a section view taken through the line V—V of FIG. 2;

Figure 6:
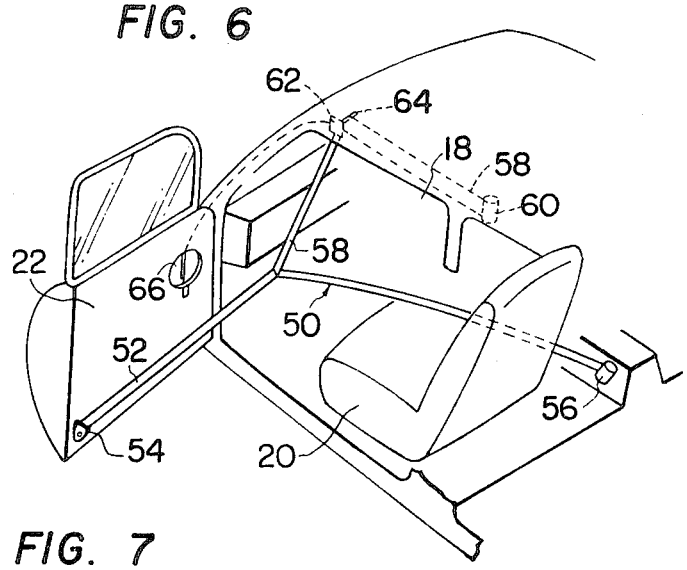
FIG. 6 is a partially cut away perspective view of a portion of a vehicle body whose door is shown in open position and which includes a semi-passive occupant restraining belt arrangement shown in an easy-enter position.

Referring now to the drawings and particularly to FIGS. 1 through 5, a vehicle body generally indicated by 10 includes a conventional windshield 12 and roof 14 that cooperate with a floor 15 including the usual transmission tunnel 16 to define an occupant compartment 18. A conventional vehicle seat 20 is supported on the floor 15 within the occupant compartment 18 in the usual manner and is accessible through a vehicle body door opening selectively opened and closed by a vehicle body door 22 whose front edge is pivoted to the vehicle body to mount the door 22 for movement between the door open position and the door closed position.

A belt arrangement generally indicated by 24 includes a lap belt 26 whose one end is fixed to the transmission tunnel 16 by a bracket 28 adjacent a lower inboard portion of the seat 20. The other end of the lap belt 26 is received by a conventional inertia retractor 30 mounted adjacent the lower rear inboard portion of the door 22 in a suitable manner. An apertured member 32 slidably receives an intermediate portion of the lap belt 26. One end of a flexible cable 34 is fixedly attached to the apertured member 32 and the other end extends through an aperture 36 in the vehicle instrument panel 38 adjacent the outboard portion of the occupant compartment 18. The other end of cable 34 is received by a body mounted retractor (not shown) positioned forward of the instrument panel 38 and responsive to door opening and closing movements.

The belt arrangement 24 also includes a shoulder belt 40 which is fixedly attached, at one end thereof, to an intermediate portion of the lap belt 26 between the one end of the lap belt 26 fixed to the transmission tunnel 16 and the apertured member 32. The shoulder belt 40 extends diagonally across the chest of a seated occupant 42 (see FIG. 4) when it is in a restraining position and an intermediate portion of the shoulder belt 40 is slidably received within an aperture in a carrier 44 that is mounted for longitudinal movement by a track member 46 conventionally secured to the roof 14 adjacent the upper edge of the vehicle door opening. From the carrier 44 the shoulder belt 40 extends rearwardly to be received by a conventional inertia retractor 48 mounted on the roof 14 adjacent an outboard upper rear portion of the seat 20 in a conventional manner.

Conventional drive mechanism, not shown, is connected to the carrier 44 in a suitable manner and move the carrier 44 between the FIG. 2 position adjacent the front end of the track member 46 and the FIG. 3 position adjacent the rear end of the track member 46.

When the door 22 is in the closed position, the cable 34 is protracted from the body mounted retractor through the aperture 36 in the vehicle instrument panel 38 and the lap belt 26 is retracted within the inertia retractor 30 mounted on the door 22 to position the apertured member 32 in a lower rearward position, whereas the carrier 44 is positioned in the FIG. 3 rearward end position and the shoulder belt 40 is retracted within the inertia retractor 48. The lap belt 26 slides through the apertured member 32 and is positioned in restraining position and the shoulder belt slides through a slot of the carrier 44 and is positioned in occupant restraining position. During door opening movement, a suitable drive mechanism connected to the body mounted retractor receiving the cable 34 responds to actuate the body mounted retractor and retracts the cable 34. The retraction of the cable 46 moves the apertured member 32 from the lower rearward position longitudinally of the vehicle body 10 to an upper forward position of FIG. 1, as the inertia retractor 30 allows protracting movement of the lap belt 26. During door opening movement another suitable drive mechanism connected to the carrier 44 also responds to move the carrier 44 from the rearward end position of FIG. 3 longitudinally along the track member 46 to a forward end position of FIG. 2, as the inertia retractor 48 allows protracting movement of the shoulder belt 40. As the aperture member 32 and the carrier 44 move to the upper forward position and the forward end position of the track member 46, respectively, the lap and shoulder belts 26 and 49 move from the occupant restraining positions to the easy-enter positions of FIG. 1 allowing convenient egression of occupant 42 from the vehicle body 10.

When the occupant subsequently again enters the vehicle body 10 assuming a seated position and subsequently closes the door 22, the drive mechanism connected to the vehicle body mounted retractor actuates the vehicle body mounted retractor to allow protracting movement of cable 34 as the inertia retractor 30 retracts the lap belt 26 and moves the apertured member 32 from the upper forward position to the lower rearward position and the drive mechanism connected to the carrier 44 moves the carrier 44 from the forward end position to the rearward end position as the inertia retractor 48 retracts the shoulder belt 40, thus moving the lap and shoulder belts 26 and 40 to the occupant restraining positions, as previously described, without any effort on the part of the occupant 42.

Figure 9:
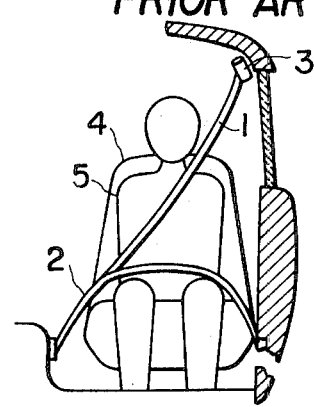
FIG. 9 is a view of a prior art arrangement in which a shoulder belt is in touch with the neck of a seated occupant.

Referring to FIG. 9 there is shown a prior art passive occupant restraining belt arrangement of the type shown in FIG. 1 in an occupant restraining position. The belt arrangement comprises a shoulder belt 1 having one end secured to an intermediate portion of a lap belt 2 and an inertia retractor 3 that is mounted on a roof adjacent an outboard upper rear portion of a vehicle seat 4. The shoulder belt 2 in its restraining position extends diagonally across the chest portion of a seated occupant 5 and from there extends rearwardly to be received within the retractor 3. With this arrangement, since the shoulder belt 1 extends to the portion on the roof adjacent the outboard upper rear portion of the vehicle seat 4 the shoulder belt 1 tends to touch the neck of the seated occupant 5 making the occupant 5 feel unplesant. If the shoulder belt 1 touches the neck of the occupant 5, it is possible to avoid this shortcoming by mounting the inertia retractor 3 on a relatively low portion such as on a side pillar of the vehicle body if the seat 4 is a driver's seat. However this will result in the extension of the shoulder belt 1 across the door opening in the generally longitudinal direction of the vehicle body when the shoulder belt is moved to an easy-enter position thus preventing the egression from and ingression into the vehicle body through the door opening. It is also possible to avoid the above-mentioned shortcoming by mounting the inertial rectractor 3 to a portion adjacent a portion above a rear door opening if the seat 4 is a driver's seat. However, this impairs visibility through a rear door window since the shoulder belt extend diagonally across the rear door window.

The above-mentioned shortcoming is also found in a semi-passive occupant restraining belt arrangement 50 shown in FIG. 6. The semi-passive belt arrangement 50 includes a lap belt 52 having one end fixed to an inboard lower rear portion of a vehicle body door 22 by a suitable attachment 54 and the other end received by a conventional inertia retractor 56 mounted adjacent a lower inboard portion of a vehicle seat 20 rear the transmission tunnel. The belt arrangement 50 also includes a shoulder belt 58 having one end secured to an intermediate portion of the lap belt 52 and the other end received by a conventional inertia retractor 60 mounted adjacent an upper inboard portion of the seat 20. A belt hanger 62 is fixedly mounted on a vehicle body 10 within an occupant compartment 18 forward and above the seat 20. The belt hanger 62 has a hook 64 that is normally in an operative position in which if and when an intermediate portion of the shoulder belt 58 is manually hung up thereon, the hook 64 will receive the shoulder belt 58. However the hook 64 is actuated by a drive motor 66 to a position to release the shoulder belt 58 therefrom upon closure of the door 22 with the seat 20 occupied. When the door 22 is opened with the shoulder belt 58 received by the hook 66 the shoulder and lap belts 58 and 52 are moved to their easy-enter positions, whereas when the door is subsequently closed with the seat 20 occupied, the shoulder belt and lap belt are moved to their occupant restraining positions to restrain the seated occupant.

The present invention aims at eliminating the above mentioned shortcoming in the passive occupant arrangement 24 shown in FIG. 1 or the semi-passive occupant restraining belt arrangement 50 shown in FIG. 6, and will be more particularly described in the following.

One embodiment of the present invention will be understood from FIGS. 2 through 5 in connection with FIG. 1, and as best seen in FIGS. 2 and 3. A guide in the form of a channel shaped member 68 is mounted securely on the vehicle body 10 within the occupant compartment 18 at a portion at which a roof side rail 70 and a side pillar 72 merge into each other. The channel shaped member 68 rides over the track member 46 so that the shoulder belt 40 extends through the aperture of the channel member 68 and is inclined with respect to the generally longitudinal direction of the vehicle body 10. As best seen in FIG. 5 in section the channel shaped member 68 is constructed of a metal core 74 covered by an outer tube 76 made of resin such as urethane. It will be noted that the channel shaped member 68 provides an arrangement in which the shoulder belt extends diagonally across the chest of the seated occupant without touching the neck of the occupant since the lower portion of the channel shaped member 68 acts as a point from which the shoulder belt 40 extends toward the occupant 42, as will be understood from FIGS. 3 and 4. The phantom lines in FIG. 4 show an imaginar position the shoulder belt 40 would take without the channel shaped member 68. It will be noted that without the channel shaped member 68 the shoulder belt would touch the neck of the occupant 42.

Figure 7:
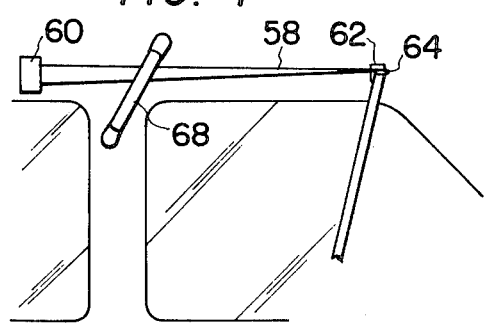
FIG. 7 is a view of the interior of the vehicle of FIG. 6 with the shoulder belt in the easy-enter position showing another embodiment of an arrangement according to the present invention in which the shoulder belt is prevented from touching the neck of a seated occupant.
Figure 8:
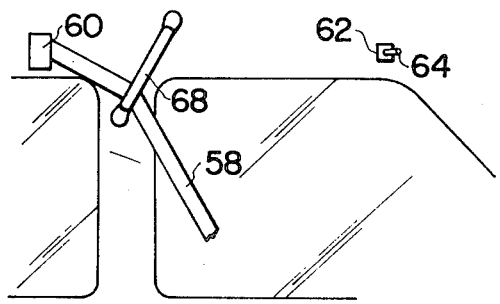
FIG. 8 is a similar view to FIG. 7 showing the shoulder belt in an occupant restraining position.

Second embodiment of the present invention will be understood from FIGS. 7 and 8 in connection with FIG. 6, in which a channel shaped member 68 similarly is attached to the vehicle body within the occupant compartment 18 and through the channel shaped member 68 the shoulder belt slidably extends. The channel shaped member 68 shown herein performs the similar function to the first embodient shown in FIGS. 1 through 5.

It will now be understood from the preceding description that in accordance with the present invention the shoulder belt 40 or 58 is prevented from touching the neck of the seated occupant.

What is claimed is:

1. In a vehicle having a vehicle body including a floor and a roof defining an occupant compartment in which is mounted a vehicle seat accessible through a vehicle door opening selectively opened and closed by a vehicle body door whose front edge is pivotally secured to the vehicle body;

an occupant restraining belt arrangement comprising:

a lap belt having one end fixed adjacent a lower inboard portion of the door;

a first inertia retractor mounted adjacent a lower inboard portion of the seat and receiving the other end of said lap belt;

a shoulder belt having one end secured to an intermediate portion of said lap belt between said one end and the other end thereof;

a second inertia retractor mounted on the roof within the occupant compartment adjacent an outboard upper rear portion of the seat;

a belt hanger fixedly mounted on the vehicle body within the occupant compartment forward and above the seat and having a hook, said hook having an operative position in which when said shoulder belt is manually hanged on said hook, said hook receives said shoulder belt;

drive means for moving said hook from the operative position to an inoperative position in which said hook will release said shoulder belt therefrom;

control means for actuating said drive means to move said hook from the operative position to the inoperative position upon closure of the door with the seat occupied; and a channel member mounted to the roof within the occupant compartment, said channel member slidably receiving an intermediate portion of said shoulder belt, to provide an arrangement in which said shoulder belt extends diagonally across the chest of a seated occupant without touching the neck thereof when said shoulder belt is in its occupant restraining position.

* * * * *